INVENTORS.
ARTHUR W. SEYFRIED
CHARLES L. SMADER
BY Bertha L. MacGregor
ATTORNEY

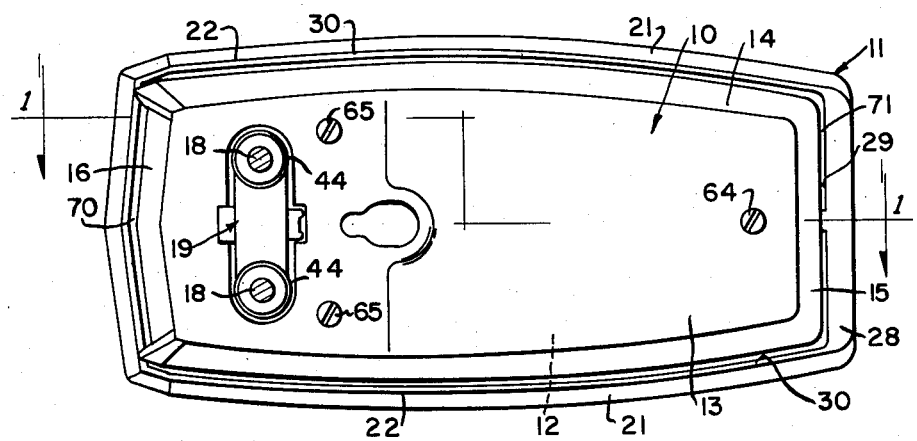
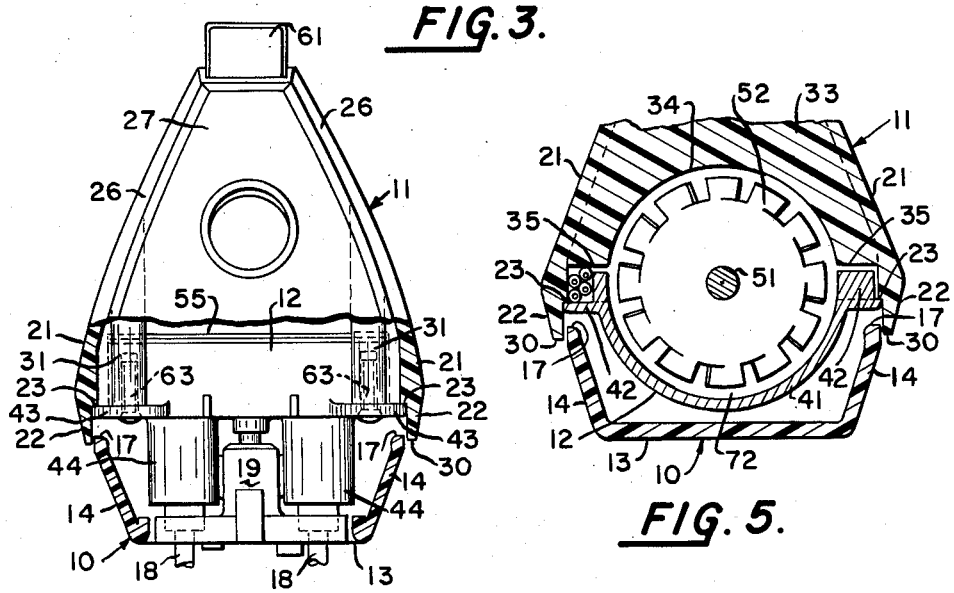
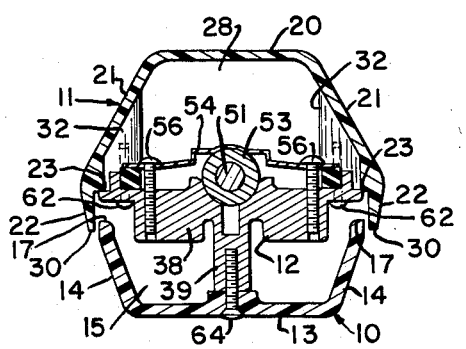

United States Patent Office 3,121,178
Patented Feb. 11, 1964

3,121,178
MOTOR DRIVEN FOOD MIXER
Arthur W. Seyfried and Charles L. Smader, Racine, Wis., assignors to Scovill Manufacturing Company, Waterbury, Conn., a corporation of Connecticut
Filed Nov. 2, 1959, Ser. No. 850,284
4 Claims. (Cl. 310—50)

This invention relates to motor driven food mixers, and more particularly to the power unit which includes the motor, gearing for driving the beater shafts, and housing therefor.

The object of the invention is to provide a low cost housing and means for mounting the motor and gearing therein, embodying also means for efficiently ventilating the motor.

Substantial cost reduction is attained by the use of plastic material in place of metal in the housing. In order to mount the motor and gearing in a housing of plastic material without sacrificing durability, it has been necessary for us to depart from conventional constructions wherein motors have been mounted in and supported by the bottom walls of metallic housings.

The power unit herein shown and described comprises a two piece housing of plastic material consisting of an upper and a lower shell or casing section, separable from each other by relative vertical movement, and not directly connected to each other. The upper and lower casing sections are retained in motor-enclosing relationship by connecting a motor supporting frame or platform to the upper casing section and connecting the lower casing section to the motor frame. The motor frame is connected by four screws to internal parts of the upper casing section, and only three screws fasten the lower casing section to the motor frame by extending through the bottom of the casing section into the frame, thus holding the two plasic sections in fixed positions relatively to each other without direct connection and without visible connecting means excepting the screws which extend through the bottom of the lower casing section and normally are not exposed to view.

The plastic casing sections are proportioned so that the upper edge portion of the lower casing is located within the lower edge portion of the upper casing section. The overlapping portions of the side walls of the two sections are slightly spaced from each other, permitting expansion and contraction due to temperature changes in the motor housing without stress or strain on the casing sections.

The overlapping portions of the opposite end walls of the two casing sections are spaced from each other sufficiently to provide air intake and air outlet openings between their proximate surfaces extending across the front and rear of the housing, for ventilation of the motor. This construction eliminates the necessity for providing apertures or slots through the casing walls for ventilation purposes which add to production cost and tend to weaken and mar the structures. Further, the motor frame is mounted in the housing in such relationship to the fan and inner parts of the casing sections that recirculation of air is prevented and a continuous flow of cool air through the housing and around the motor is insured.

Another factor which contributes substantially to the low cost of production of the mixer herein shown and described is the construction of the motor frame and its use as a means for supporting all the power unit internal parts, including the motor shaft, motor bearings, armature, field mounting, the worm and gear reduction means in the grease box, as well as the lower portion of the beater ejector mechanism.

The motor frame is a die casting, simple and easy to make, and therefore low in cost. The top side is used for accurate mounting of the aforementioned parts thereon before the frame is attached to any part of the housing. The die casting is trimmed at the parting line. Since no part of the die cast frame is exposed after being made a part of the mixer, there is no need for painting or polishing to remove die imperfections such as develop with use. The frame may be made as light as possible while retaining required ruggedness.

The motor frame is connected only at its four corners to the upper casing section by screws which extend through the frame into bosses integrally formed on the inner surfaces of the upper casing. The upper casing is formed to provide inner side members between the bosses against which the motor frame bears and prevents recirculation of the cooling air admitted to the housing between the casing sections.

In the drawings:

FIG. 3 is a bottom elevational view of the power unit, showing the beater shafts in section.

FIG. 4 is a front elevational view of the mixer shown in FIG. 1, the housing being broken away to show the means for connecting the forward end of the motor frame to the interior of the upper casing, and showing in section the relative positions of the side walls of the upper and lower casing sections.

FIG. 5 is a transverse vertical sectional view in the plane of the line 5—5 of FIG. 1.

FIG. 6 is a transverse vertical sectional view in the plane of the line 6—6 of FIG. 1.

Figure 1:
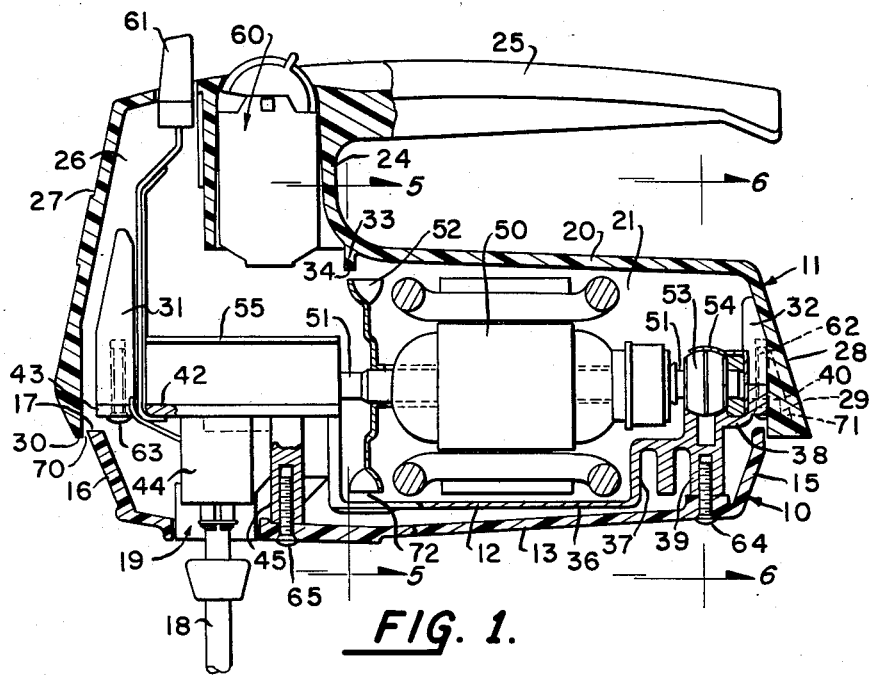
FIG. 1 is a longitudinal vertical sectional view of a food mixer embodying our invention, in the plane of the line 1—1 of FIG. 3, showing the beater shafts broken away.

In the preferred embodiment of our invention shown in the drawings, the power unit of the mixer comprises a lower casing section 10, upper casing section 11 and motor frame 12. The casing sections 10 and 11 are made of plastic material. The motor frame 12 preferably is a die casting of metal.

The lower casing section 10 has a substantially flat bottom 13, side walls 14, rear wall 15 and front wall 16, the said walls being upwardly and outwardly inclined. The upper edges 17 of the walls 14, 15, 16 are in one generally horizontal plane. The bottom 13 has an opening in its forward portion to accommodate the beater shafts 18 and beater shaft ejector 19 not shown in detail herein.

The rearward portion of the upper casing section 11 has a flat top 20 and downwardly and outwardly inclined side walls 21 which terminate in substantially vertical lower portions 22. Near the junction of the side walls 21, 22 is an inwardly thickened area which forms a downwardly facing horizontal shoulder 23. Forwardly of the top 20, the casing 11 extends upwardly as indicated at 24, merging with a handle 25, and with upper side walls 26 which merge into the front wall 27 downwardly and outwardly inclined as shown in FIG. 1. It will be understood that the side walls 26 are continuations of the walls 21, 22. At the rear end, the upper casing section has a wall 28, internally recessed as indicated by the dotted line 29. The lower edges 30 of the walls 22, 27, 28 are in a generally horizontal plane slightly below the plane of the edges 17 of the walls of the lower casing section.

The upper casing 11 is providing with bosses 31 which project inwardly from the side walls 26 near their forward edges as shown in FIGS. 1 and 4. Bosses 32 project inwardly from the side walls 21 near their rearward edges as shown in FIGS. 1 and 6. A vertically disposed baffle 33, best shown in FIGS. 1 and 5, is integral with the upper casing walls 20, 21, and extends downwardly from the top 20 near the part where the latter merges with the upwardly extending wall 24. The lower edge of the baffle 33 is curved as indicated at 34 and has flat lower side surfaces 35 at opposite sides of the curved part 34.

Each of the casing sections 10, 11 is integrally formed, and all of the parts described are made of plastic material.

Figure 2:
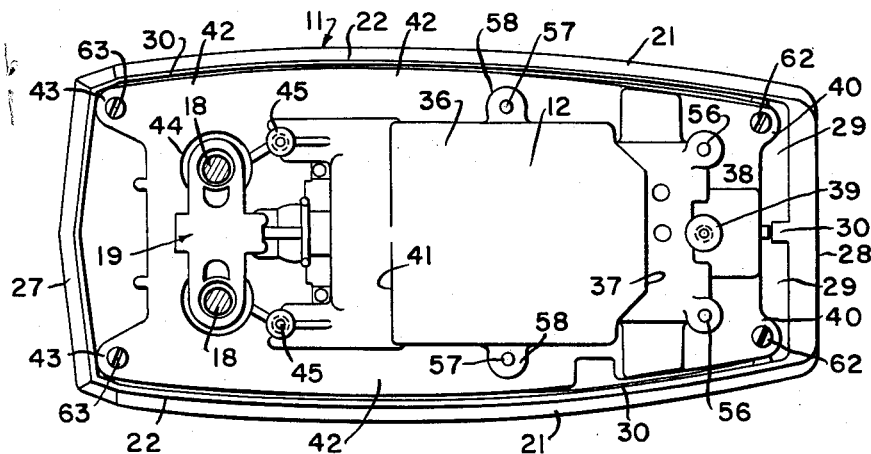
FIG. 2 is a bottom elevational view of the motor frame, showing part of the upper casing section to which the frame is attached.

The motor frame or platform 12 preferably is a metal die casting. It comprises a central generally flat lowermost member 36, upturned at its longitudinal sides, integral with a transversely extending upwardly directed web 37 and a rearwardly located block or support 38. As shown in FIG. 6, the support 38 is shaped and cored to form a screw-receiving depending stud 39. At the rearward end of opposite sides the support 38 is provided with apertured projections 40. Forwardly of the area 36, the motor frame 12 is curved transversely as indicated at 41 in FIG. 5 and provided with a horizontally disposed shelf 42 which extends longitudinally of the frame 12 at opposite sides thereof, the ends of the shelf members 42 terminating at the front in apertured projections 43 as shown in FIG. 2.

The forward portions of the side members 42 of the frame are integral with bearings 44 for the shafts which drive the beater shafts 18. Adjacent the transversely curved portion 41 of the motor frame and forwardly thereof, the frame is provided with depending studs 45 cored to provide screw-receiving apertures for a purpose to be described.

To assemble the described structures, certain parts first are mounted on the motor frame 12. These include the motor 50, motor shaft 51, fan 52, bearing 53, retaining strap 54 and gear housing 55. The connections between the said parts and the frame may vary, but as shown they include screws 56 which extend through the retaining strap 54 into the support member 38 of the frame, and screws 57 which extend through the ears 58 of the frame to retain parts mounted on the frame.

Before attaching the motor frame 12 and parts mounted thereon to the upper casing section 11, the switch mechanism indicated as a whole at 60 and the ejector actuating mechanism 61 are mounted in the upper casing. Then the frame 12 is attached to the casing section 11 by four screws, the two rearward screws 62 extending upwardly through the apertured projections 40 into the bosses 32, and the two forward screws 63 extending upwardly through the apertured projections 43 into the bosses 31 of the casing 11. The shelf members 42 of the frame contact the downturned shoulder 23 of the casing 11 and are closely adjacent the flat surface 35 of the baffle 33, as shown in FIG. 5. Thus the motor frame and all parts supported thereon are carried by the upper casing by means located entirely within the casing.

Finally the lower casing section 10 is attached to the frame by three screws, the rearward screw 64 extending upwardly through the casing bottom 13 into the depending stud 39 of the support 38 and two forwardly located screws 65 extending upwardly through the casing bottom 13 into the depending studs 45 of the frame 12. The stud 39 rests on a reinforced portion of the bottom 13 surrounding the screw opening, as shown in FIG. 1.

The described construction comprises a low cost but durable housing of plastic material consisting of two casing sections which are firmly retained in their intended motor-gearing enclosing relationship without being directly connected together and without actual contact between the adjacent overlapping edges of the two sections. The construction permits of expansion and contraction of the plastic material due to temperature changes in use without stress or strain on the casing.

Means for ventilating the motor are provided without the use of ventilating slots or apertures extending through the plastic casing sections. The space 70 between the edge 17 of the casing 10 and edge 30 of the casing section 11 at the front of the housing provides an air intake opening between the casing sections which extends across the entire front. The space 71 between said edges at the rear of the housing provides an air outlet opening between the casing sections which extends across the entire rear. Air is drawn into the housing through the opening 70 and passes to the concentric space 72 between the fan 52 and the curved part 41 of the frame 12 and baffle 33, then to and around the motor 50 and out through the opening 71. The arrangement shown produces very efficient ventilating means at low cost and without slotting or marring of the smooth plastic surfaces. Recirculation of the air is prevented by the baffle and other construction shown in FIG. 5, whereby the air is confined to the concentric annular path defined by the space 72 around the fan as the air passes to the motor 50.

Changes in details of construction and form of parts may be made without departing from the invention as defined in the appended claims.

We claim:
1. A power unit for motor driven food mixers and the like, comprising
    (a) a housing consisting of upper and lower separate hollow casing sections of non-metallic thermally expansible material,
    (b) the upper section having a top and side and end walls depending from the top,
    (c) a handle on the top of said upper section,
    (d) the lower casing section having a bottom and side and end walls rising from the bottom,
    (e) the side and end walls of each casing section having free generally horizontally disposed edges spaced from the edge portions of the other casing section,
    (f) a motor,
    (g) a fan,
    (h) beater shaft mounting means,
    (i) gearing between the motor and said beater shaft mounting means,
    (j) a separate die cast motor frame provided with seats for supporting the motor, fan, beater shaft mounting means and gearing,
    (k) means connecting the motor frame only to the upper casing section, and
    (l) means connecting the lower casing section only to the motor frame,
    (m) whereby the frame and parts supported thereon are carried only by the upper casing section when the power unit is lifted by a user grasping the handle, and said casing sections are retained in non-contacting, non-stress transmitting relationship and have their free edge portions spaced from each other to permit expansion without strain and to provide motor ventilation.

2. The power unit defined by claim 1, which includes
    (a) a vertically disposed transversely extending baffle depending from the upper casing section above the fan and providing with the motor frame an air space peripherally surrounding the fan, said air space communicating with the atmosphere through the spaces between opposite end walls of the casing sections, and said baffle preventing recirculation of air passing through the motor.

3. The power unit defined by claim 1, in which
   (a) the upper casing section has screw receiving bosses provided with flat lower surfaces formed integrally on the inner surfaces of its depending walls, and
   (b) the means which connect the motor frame to the upper casing section are screws which extend upwardly through the corners of the frame into said bosses and retain the frame against said flat lower surfaces.

4. The power unit defined by claim 2, in which the frame is provided with oppositely positioned shelf members on its longitudinal sides which cooperate with opposite side portions of the baffle to prevent recirculation of air through the motor.

References Cited in the file of this patent

UNITED STATES PATENTS

| | | |
|---|---|---|
| 2,469,932 | Ritter | May 10, 1949 |
| 2,719,238 | Collura | Sept. 27, 1955 |
| 2,931,926 | De Angelis et al. | Apr. 5, 1960 |